W. O. BOSTROM.
PLANTER ATTACHMENT.
APPLICATION FILED MAY 22, 1912.
1,063,768.
Patented June 3, 1913.
2 SHEETS—SHEET 1.
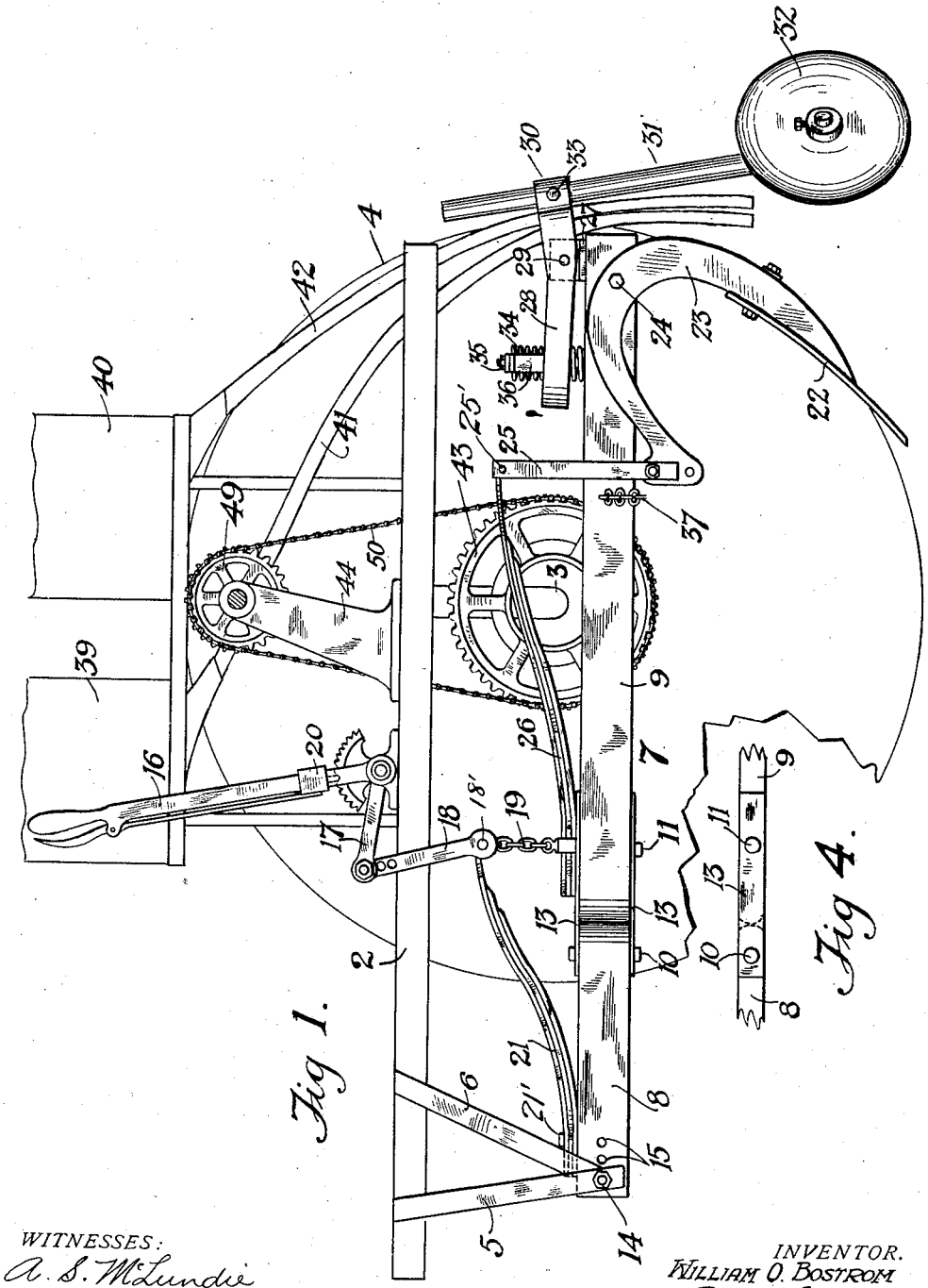
WITNESSES:
A. S. McLundie
M. R. Stern
INVENTOR.
WILLIAM O. BOSTROM
BY 
ATTORNEY.

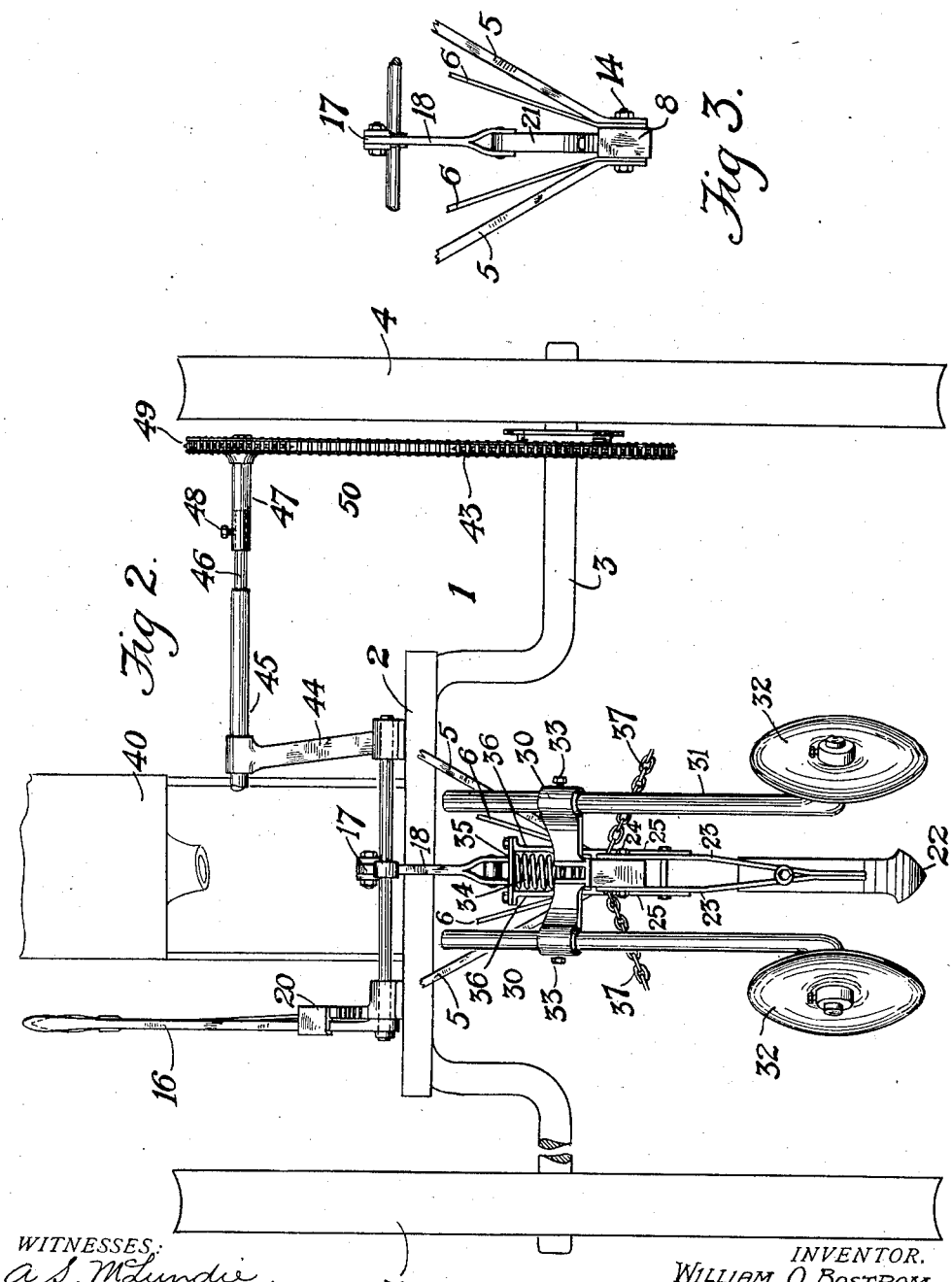

UNITED STATES PATENT OFFICE.

WILLIAM OSCAR BOSTROM, OF RISING FAWN, GEORGIA.

PLANTER ATTACHMENT.

1,063,768.  Specification of Letters Patent.  Patented June 3, 1913.

Application filed May 22, 1912. Serial No. 698,976.

*To all whom it may concern:*

Be it known that I, WILLIAM OSCAR BOSTROM, a citizen of the United States, residing at Rising Fawn, in the county of Dade and State of Georgia, have invented new and useful Improvements in Planter Attachments, of which the following is a specification.

My present invention relates to improvements in and connected with planters and is particularly adapted for connection to a vehicle or wheeled implement, such as a cultivator.

The principal objects of my invention are, to adapt the device embodying my invention for connection with or attachment to existing wheeled implements in such a manner as to be supported thereby and, if desired, to coöperate therewith in the particular function it is called upon to perform; to enable the device to be adjusted with respect to the disposition of coöperating parts of the existing implement, when the attachment is to act in conjunction therewith; to enable the attachment to be quickly drawn out of operative relation to the soil when desired; and, to yieldably mount certain elements, which work the soil, as to permit them to move over rigid obstructions which might otherwise mutilate or break such elements.

In the drawings, forming a part of this specification: Figure 1 is a view in part vertical section and part elevation of the vehicle of a disk cultivator, showing the device embodying my invention attached thereto. Fig. 2 is a fragmentary rear elevation of the device as disclosed in Fig. 1. Fig. 3 is a fragmentary front elevation of portions of the attachment and adjusting means of the device embodying my invention. Fig. 4 is a fragmentary plan view of means for articulating the attachment beam so that a portion thereof may be swung laterally.

Similar characters refer to similar parts throughout the views.

A cultivator, designated generally at 1, includes framework 2, axle 3 and wheels 4, all of which may be of any suitable construction consistent with the use thereof, that is, a vehicle to be drawn over soil which is to be cultivated. The said framework 2 has secured thereto, downwardly extending arms 5 and 6 which provide means for pivotally connecting a beam 7, disposed to extend rearwardly from said arms, with respect to the vehicle, and in under said framework 2, so that it may be raised or lowered with respect thereto.

For a purpose to be subsequently disclosed, it is desirable that the beam 7 be formed in two parts 8 and 9, and articulated as at 10 and 11, by plates 13, to permit the part 9 to swing laterally with respect to the axis of part 8. The means for pivoting the part 8 to the arms 5 and 6, may be accomplished by bolt 14 and the said part 8 provided with a plurality of apertures 15 for the reception of said bolt, so that the beam, as a whole, may be operatively positioned with respect to the vehicle.

At a point to the rear of pivotal member 14, the beam 7 is supported by means of an adjustable lever 16, adapted to be manually actuated and supported on framework 2; arm 17 rigid with said lever; link 18 having one end connected to said arm 17 and a flexible member 19, such as a chain, operatively connected to the other end of said link 18 and to the beam 7, the point of connection of the member 19 with the beam, being preferably by means of the pivoting member 11, which serves the dual purpose of a pivot point for the beam, and an eye bolt for supporting the same by the adjusting mechanism hereinbefore described. The lever 16 is provided with pawl and ratchet mechanism 20 by which it is normally retained in a set position. Yieldable means, such as a leaf spring 21, rigidly attached to beam 8 at 21′ is adapted to normally separate the beam from said link 18, to which it is connected at one end at 18′ as is obvious from the drawing, but the said beam may be raised by forces acting thereupon without altering the position of the adjusting lever 16.

Adjacent the rear end of beam 7, a furrow opening blade 22 is pivotally carried, by complementary bell crank arms 23, disposed at each side of the beam, pivoted as at 24 with the one extension carrying the blade 22 and the other extension having adjustably pivoted thereto one end of links 25, the other end of said links having operatively secured thereto, at 25′ a yieldable member 26, such as a leaf spring, which normally tends to throw the said blade 22 forwardly, but permitting it to yield to obstructions in the soil, such as stones. The rear end of said beam 7 also carries a small standard 27, adapted to pivotally support a U-shaped bracket 28, pivoted intermediate ends as at 29. To the rear of pivot point 29, the bracket is provided with sleeves 30, each adapted to receive a supporting rod 31 of disk coverer 32, the said rod being retained in an adjusted position by means of set screws 33 or any equivalent. Said U-shaped bracket 28 extends, at the front of the pivot point 29, about a coil spring 34 mounted upon the beam 7 and a cap 35 mounted upon said spring and operatively connected to the bracket 28, by ties 36, normally actuate the brackets to present the disks 32 forwardly in the path of movement of the vehicle, but permitting the bracket to yield when the disks encounter an obstruction.

Inasmuch as it is desirable to adapt the device to operate in conjunction with some agricultural implement, such as a cultivator, the beam portion 9 may be adjusted with respect to the axis of portion 8, so that the blade 22 and disks 32 are positioned in operative relation to some soil worker or planter, in advance of, intermediate or to the rear of said blade 22 and disks 32, and which worker or planter is a permanent part of the vehicle. This is accomplished through the articulated beam, and chains 37 which are adapted for connection to some rigid portion of the vehicle, so that the said beam portion 9 to which the chains are connected, may be held in a substantially predetermined position with respect to the portion 8.

Any suitable fertilizer attachment, designated by 39, or planter 40, or both, may be carried by the vehicle 1, and their dispensing means, 41 and 42, respectively, deliver at the rear of blade 22. As a means for actuating the fertilizer attachment and planter, a spur wheel 43 may be carried by one of the wheels 4, while a bracket 44, mounted on frame 2, forms a bearing for a shaft 45 operatively connected to the control mechanism of the attachment. Said shaft 45 has a reduced portion 46, over which a sleeve shaft 47 may be slid longitudinally, and is secured in an adjusted position by set screw 48, or the like, the said sleeve shaft 47 carrying a sprocket 49, to receive a drive chain 50 from spur wheel 43. The said sleeve shaft enables the mechanism to be adjusted to practically any sized vehicle in common use.

The operation of the device as is follows: The beam 7 having been connected to the vehicle, the former is adjusted with respect to the axis of the vehicle to position the blade 22 and disks 32 to operate in conjunction with the elements working the soil, and carried by the vehicle, and is retained in substantially a rigid position by the chains 37. When it is desired to raise the implement carried by the beam 7 from contact with the soil, the lever 16 is manually operated against the force of gravity. When the blade 22 and disks 32 are in operative relation to the soil, the former opens the furrow for the fertilizing material and seed, while the latter covers the material thus deposited. It is to be noted that both the blades 22 and disks 32 are yieldably mounted, independently of each other, and may yield to any obstruction which they encounter and which would tend to mutilate or break the elements.

I claim:—

1. In combination with a wheeled implement, of a drag beam carried thereby and adapted to swing in a vertical plane, a lever carried by said implement, flexible means having one end connected with said drag beam, mechanism operatively connecting said lever with the other end of said flexible means to impart movement of the former to the latter for controlling the position of said drag beam and to pendently support the same, a spring adapted to tension said flexible means, and a soil working element carried by said beam, substantially as and for the purpose set forth.

2. In combination with a wheeled implement, of a drag beam carried thereby, adapted to swing in a vertical plane and articulated to swing laterally, flexible means for retaining said beam in a predetermined adjusted position laterally with respect to said implement, a lever carried by said implement, flexible means having one end connected with said drag beam, mechanism operatively connecting said lever and the other end of said second mentioned flexible means to impart movement of the former to the latter for controlling the position of said beam in an upright plane and for pendently supporting the same, a spring adapted to tension said second mentioned flexible means, and a soil working element carried by said beam, substantially as and for the purpose set forth.

In testimony whereof I affix my signature in the presence of two witnesses.

WILLIAM OSCAR BOSTROM.

Witnesses:
J. H. McLean,
A. S. McLundie.